United States Patent
Brennan et al.

(10) Patent No.: US 12,258,438 B2
(45) Date of Patent: Mar. 25, 2025

(54) PROCESS FOR MAKING A FLEXIBLE POLYURETHANE FOAM HAVING A HARDNESS GRADIENT

(71) Applicant: Huntsman International LLC, The Woodlands, TX (US)

(72) Inventors: Mark Joseph Brennan, Aarschot (BE); Chingchung Vincent Huang, Shanghai (CN); Zhicheng George Tian, Shanghai (CN); Alain Germain Marc Veys, Deggendorf (DE); Mario Unverdorben, Deggendorf (DE)

(73) Assignee: HUNTSMAN INTERNATIONAL LLC

( * ) Notice: Subject to any disclaimer, the term of this patent is extended or adjusted under 35 U.S.C. 154(b) by 97 days.

(21) Appl. No.: 17/619,272

(22) PCT Filed: Jun. 19, 2020

(86) PCT No.: PCT/EP2020/067062
§ 371 (c)(1),
(2) Date: Dec. 15, 2021

(87) PCT Pub. No.: WO2020/260145
PCT Pub. Date: Dec. 30, 2020

(65) Prior Publication Data
US 2022/0227918 A1 Jul. 21, 2022

(30) Foreign Application Priority Data

Jun. 26, 2019 (EP) .................................. 19182576

(51) Int. Cl.
| | |
|---|---|
| B29C 39/00 | (2006.01) |
| B29C 39/12 | (2006.01) |
| B29C 39/36 | (2006.01) |
| C08G 18/08 | (2006.01) |
| C08G 18/10 | (2006.01) |
| C08G 18/18 | (2006.01) |
| C08G 18/40 | (2006.01) |
| C08G 18/48 | (2006.01) |
| C08G 18/63 | (2006.01) |
| C08G 18/76 | (2006.01) |
| B29K 75/00 | (2006.01) |
| C08G 101/00 | (2006.01) |

(52) U.S. Cl.
CPC ........ *C08G 18/7671* (2013.01); *B29C 39/003* (2013.01); *B29C 39/12* (2013.01); *B29C 39/36* (2013.01); *C08G 18/14* (2013.01); *C08G 18/1825* (2013.01); *C08G 18/4816* (2013.01); *C08G 18/4841* (2013.01); *B29K 2075/00* (2013.01); *C08G 2101/00* (2013.01); *C08G 2110/0008* (2021.01); *C08G 2110/0041* (2021.01); *C08G 2110/0083* (2021.01); *C08G 2350/00* (2013.01)

(58) Field of Classification Search
None
See application file for complete search history.

(56) References Cited

U.S. PATENT DOCUMENTS

| | | | |
|---|---|---|---|
| 5,945,185 A | 8/1999 | Hirai et al. | |
| 8,017,229 B2 | 9/2011 | Zhang et al. | |
| 2017/0121448 A1* | 5/2017 | Yoshitomi | .......... C08G 18/4816 |
| 2017/0121482 A1 | 5/2017 | Yoshitomi et al. | |

FOREIGN PATENT DOCUMENTS

| | | |
|---|---|---|
| CN | 106459351 A | 2/2017 |
| CN | 108409940 | 8/2018 |
| EP | 3156431 | 4/2017 |
| JP | 2006045267 A * | 2/2006 |
| JP | 2015117275 A | 6/2015 |
| RU | 2245164 C2 | 1/2005 |
| WO | 2021000287 A1 | 1/2021 |

OTHER PUBLICATIONS

Machine translation of CN 108409940 to Li et al. obtained from Clarivate Analytics in Jun. 2023 (Year: 2023).*
Machine translation of JP-2006045267-A obtained from Clarivate Analytics in Jun. 2024 (Year: 2024).*
International Search Report received in corresponding PCT Application No. PCT/EP2020/067062 completed Sep. 8, 2020 and mailed Sep. 16, 2020.
Written Opinion received in corresponding PCT Application No. PCT/EP2020/067062 completed Sep. 8, 2020 and mailed Sep. 16, 2020.
India First Examination Report issued Sep. 1, 2023 in corresponding Indian application No. 202117058653.
Kuhmo Mitsui Chemicals Product List.
Technical Data Sheet CG-63S.

* cited by examiner

*Primary Examiner* — Melissa A Rioja
(74) *Attorney, Agent, or Firm* — HUNTSMAN INTERNATIONAL LLC; Lewis Craft (57) ABSTRACT

A molded flexible polyurethane foam having a hardness gradient going from soft to hard from the top to the bottom of the foam. The hardness gradient in the foam is a result of a foam elasticity gradient which arises from a polymer elasticity gradient and/or density gradient. A method for producing a flexible foam having a hardness gradient and a reactive mixture suitable for making said flexible foam is disclosed. Furthermore, the use of the flexible foams having a hardness gradient in matrasses, cushions for seating (more in particular for use in automotive seating), furniture, automotive under-carpets and dash insulators is disclosed.

16 Claims, 7 Drawing Sheets

PROCESS FOR MAKING A FLEXIBLE POLYURETHANE FOAM HAVING A HARDNESS GRADIENT

CROSS-REFERENCE TO RELATED APPLICATIONS

This application is the National Phase of International Application PCT/EP2020/067062 filed Jun. 19, 2020 which claims priority to EP Application filed Jun. 26, 2019. The noted applications are incorporated herein by reference.

FIELD OF INVENTION

The present invention relates to a molded flexible polyurethane foam having a hardness gradient going from soft to hard from the top to the bottom of the foam. The hardness gradient in the foam is a result of a foam elasticity gradient which arises from a polymer elasticity gradient and/or density gradient.

Surprisingly we have now found a method for producing a flexible foam having a hardness gradient and a reactive mixture suitable for making said flexible foam.

The invention further relates to the use of flexible foams having a hardness gradient in matrasses, cushions for seating, more in particular for use in automotive seating.

BACKGROUND OF THE INVENTION

Improvements in passenger compartment comfort continue to be one of the key needs of the global transportation industry. Since their introduction more than 40 years ago, flexible molded polyurethane foams have successfully contributed to the comfort provided by all forms of transportation seating. Comfort experience is a combination of many different factors, including the trend towards a density reduction in foams to give the passenger the experience of a softer foam whilst maintaining the technical performance specifications such as giving sufficient support continues which implies having a much harder foam at the bottom part of the foam.

The problem is currently solved by creating a multilayer foam layup by adding a softer layer of slabstock foam on top of a normal molded much harder foam seat pad. The current solution is non-ideal as an additional process step and two different (foam) materials are required.

SUMMARY OF THE INVENTION

According to a first aspect, a molded flexible polyurethane comprising foam with a hardness gradient is disclosed. Said foam comprises at least
- a top layer which has a thickness (height) which corresponds to around 25% of the total thickness (height) of the foam,
- a bottom layer which has a thickness (height) which corresponds to around 25% of the total thickness (height) of the foam,
- A foam elasticity $E_f$ in the bottom layer of said foam which is at least 3 times higher, preferably 3 up to 10 times higher than in the top layer of said foam and wherein said foam elasticity corresponds to formula [2]:

$$E_f = \omega_n^2 \frac{mh}{A} \quad [2]$$

With
- $\omega_n$=the natural frequency
- m=a fixed mass
- h=the thickness of the foam sample
- A=the cross-section area of the foam sample According to embodiments, the molded flexible foam according to the invention is having a polymer elasticity $E_p$ in the bottom layer of said foam which is at least 2 times higher, preferably 2 up to 8 times higher than in the top layer of said foam and wherein said polymer elasticity corresponds to formula [1]:

$$E_p = \frac{E_f}{R^2} \quad [1]$$

With
Relative density (R) defined as $$R = \frac{\rho_f}{\rho_p}$$

Polyurethane polymer density $(\rho_p)$=1200 kg/m³,
Polyurethane foam density $(\rho f)$ being measured according to ISO 845
molded flexible polyurethane comprising foam with a hardness gradient, wherein said foam comprises at least:
- a top layer which has a thickness (height) which corresponds to around 25% of the total thickness (height) of the foam,
- a bottom layer which has a thickness (height) which corresponds to around 25% of the total thickness (height) of the foam,
- A foam elasticity $E_f$ in the bottom layer of said foam which is at least 3 times higher, preferably 3 up to 10 times higher than in the top layer of said foam and wherein said foam elasticity corresponds to formula [2]:

$$E_f = \omega_n^2 \frac{mh}{A} \quad [2]$$

With
- $\omega_n$=the natural frequency
- m=a fixed mass
- h=the thickness of the foam sample
- A=the cross-section area of the foam sample According to embodiments, the molded flexible foam according to the invention is having a foam density $\rho_f$ in the bottom layer of said foam which is 10% up to 40% higher than in the top layer of said foam.

According to embodiments, the molded flexible foam according to the invention is having a polymer elasticity $E_p$ in the bottom layer of said foam which is at least 2 times higher, preferably 2 up to 8 times higher than in the top layer of said foam and wherein said polymer elasticity corresponds to formula [1] and a hardness gradient has a foam density $\rho_f$ in the bottom layer of said foam which is 10% up to 40% higher than in the top layer of said foam.

According to embodiments, the molded flexible foam according to the invention is having a polymer elasticity $E_p$ in the top layer which is lower than the polymer elasticity $E_p$ in the core (middle section) of the foam.

According to embodiments, the molded flexible foam according to the invention is having a foam density $\rho_f$ in the bottom half of the foam which is higher than the foam density $\rho_f$ in the top half of the foam.

According to embodiments, the molded flexible foam according to the invention is having a polymer elasticity $E_p$ in the top layer which is lower than the polymer elasticity $E_p$ in the middle section of the foam and a foam density $\rho_f$ in the bottom half of the foam which is higher than the foam density $\rho_f$ in the top half of the foam.

According to a second aspect, a reactive foam formulation for making the foam according to the invention is disclosed. Said formulation is formed by mixing at an isocyanate index in the range 70-130, preferably in the range of 75-110, more preferably in the range 75-100 at least:

a) An isocyanate-reactive composition (a) comprising
   a polyether polyol (a1) having an oxypropylene (PO) content of 51-100% by weight, an oxyethylene (EO) content of 0-49% by weight, preferably at most 20% by weight calculated on the total weight of the polyol (a1), an average nominal hydroxyl functionality of 2-4 and an average molecular weight of 2000-7000,
   optionally a polyether polyol (a2) having an oxyethylene content of 50-95% by weight, calculated on the weight of this polyol wherein the weight ratio of polyol (a2) in the isocyanate-reactive composition (a) is in the range of 0 to 20% by weight, preferably in the range 0 to 10% by weight, more preferably in the range 0 to 5% by weight calculated on the total weight of the isocyanate-reactive composition (a), and
   optionally a filled polyether polyol (a3), also called polymer polyol, wherein the weight ratio of polyol (a3) in the isocyanate-reactive composition (a) is in the range of 0 to 30% by weight, preferably in the range 0 to 20% by weight calculated on the total weight of the isocyanate-reactive composition (a)

b) a polyisocyanate composition (b) comprising having an NCO value in the range 21 up to 27%, preferably in the range 23 up to 25.5%.

According to embodiments, the polyisocyanate composition (b) in the reactive foam formulation for making the foam according to the invention is first pre-reacted (i.e. pre-polymerized) with a polyol and the amount reacted polyol in the polyisocyanate composition (b) is in the range 0-40% by weight, preferably in the range 0-30% by weight, more preferably in the range 0-20% by weight, calculated on the total weight of the polyisocyanate composition (b).

According to embodiments, the polyisocyanate composition (b) is a composition comprising 0-12% by weight, preferably 0-10% by weight methylene diphenyl 2,4'-diisocyanate (2,4 MDI) calculated on the total weight of all polyisocyanate compounds in the polyisocyanate composition and an NCO value in the range 21 up to 27%, preferably in the range 23 up to 25.5%.

According to embodiments, the polyisocyanate composition (b) is a composition comprising 0-12% by weight, preferably 0-10% by weight methylene diphenyl 2,4'-diisocyanate (2,4 MDI) and comprising at least 40%, preferably at least 50% by weight of 4,4'-diphenylmethane diisocyanate (4,4 MDI) calculated on the total weight of all polyisocyanate compounds in the polyisocyanate composition and an NCO value in the range 21 up to 27%, preferably in the range 23 up to 25.5%.

According to embodiments, the polyisocyanate composition (b) is having an NCO value in the range 21 up to 27%, preferably in the range 23 up to 25.5%.

According to embodiments, the polyisocyanate composition (b) is having an NCO value in the range 20 up to 25.5%, preferably in the range 23 up to 25.5%.

According to embodiments, the reactive foam formulation for making the foam according to the invention further comprises additives such as blowing agents, catalysts, chain extenders and other additives such as fire retardants, fillers, surfactants, . . . .

According to embodiments, the reactive foam formulation for making the foam according to the invention further comprises blowing agents, said blowing agent comprising at least water and the amount of water used is 0.5 up to 10% by weight, preferably 1 up to 5% by weight calculated on the total weight of all ingredients being present in the isocyanate-reactive composition (a) used to form the reactive foam formulation according to the invention.

According to a third aspect, a process for making the flexible foam according to the invention is disclosed, said process comprising at least the steps of:

i. mixing the polyisocyanate composition (b) with the isocyanate-reactive composition (a) at an isocyanate index in the range 70-130, preferably in the range of 75-110, more preferably in the range 75-100 to obtain the reactive foam formulation according to any of claim 9-12, and then ii. casting the reactive foam formulation obtained in step i. into a mold to obtain flexible foam having a hardness gradient, and then iii. demoulding the obtained flexible foam having a hardness gradient characterized in that step iii. is performed such that there is a temperature difference ($\Delta T$) of at least 25-30° C. between the temperature of the reactive foam formulation ($T_{chemicals}$) and the temperature of the mold ($T_{mold}$).

According to embodiments, the temperature difference $\Delta T$ between the initial reactive foam formulation used ($T_{chemicals}$) and the temperature of the mold ($T_{mold}$) is at least 25-30° C., more preferably at least 30-50° C., most preferred the temperature difference $\Delta T$ is at least in the range 35-55° C.

According to embodiments, the minimum temperature of the initial the reactive foam formulation used ($T_{chemicals}$) is 10-15° C., preferably $T_{chemicals}$ is around room temperature and the temperature of the mold ($T_{mold}$) is at least 50° C. and below 100° C., preferably $T_{mold}$ is in the range 55° C. up to 70° C., more preferably in the range 60° C. up to 70° C.

According to a fourth aspect, the use of the molded flexible foam according to the invention as automotive seats, matrasses, furniture, automotive under-carpets and dash insulators is disclosed.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention.

Definitions

In the context of the present invention the following terms have the following meaning:

1) isocyanate index or NCO index or index:

the ratio of NCO-groups over isocyanate-reactive hydrogen atoms present in a formulation, given as a percentage:

$$\frac{[NCO] \times 100}{[\text{active } H \text{ atoms}]}\%$$

In other words, the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the foamed material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen and one primary amine group is considered to comprise one reactive hydrogen.

3) The expression "Reaction system", "Reactive foam formulation" and "Reactive mixture" as used herein refers to a combination of reactive components used to make a polyurethane comprising foam wherein the polyisocyanates are usually kept in one or more containers separate from the isocyanate-reactive components.

4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

5) The word "average" refers to "number average" unless indicated otherwise.

6) The word "gradient" as used herein refers to a change in the value of a variable (such as temperature, hardness, elasticity, concentration, . . . ) with change in a given variable and especially per unit distance in a specified direction. Gradient is given herein as a number wherein the number is the difference between the maximum and minimum value observed for that variable. For example, the foam according to the invention has a foam elasticity $E_f$ gradient which means that the foam elasticity $E_f$ in the bottom layer of said foam can be 3 up to 4 times higher than in the top layer of said foam.

7) The reference towards a "top layer" and a "bottom layer" in the foam according to the invention refers to a molded foam having a softer top layer due to a lower foam elasticity in that top layer of the foam and at the same time having a harder bottom layer due to a higher foam elasticity in that bottom layer of the foam. For the interpretation of the hardness gradient in the foam according to the invention, the top layer of the molded foam corresponds to the layer which is in contact with the lowermost part of the mold and which is when taking the foaming process into account formed in the beginning (at the start) of the foaming process. The top layer of the foam has a thickness (height) which can correspond up to 25% of the total thickness (height) of the foam. The bottom layer of the molded foam corresponds to the layer which is in contact with the uppermost part of the mold and which is when taking the foaming process into account formed at the end of the foaming process. The bottom layer of the foam has also a thickness (height) which can correspond up to 25% of the total thickness (height) of the foam.

8) The term "room temperature" refers to temperatures of about 20° C., this means referring to temperatures in the range 18° C. to 25° C. Such temperatures will include, 18° C., 19° C., 20° C., 21° C., 22° C., 23° C., 24° C. and 25° C.

9) Unless otherwise expressed, the weight percentage (indicated as % wt or wt %) of a component in a composition refers to the weight of the component over the total weight of the composition in which it is present and is expressed as percentage.

10) Unless otherwise expressed, parts by weight (pbw) of a component in a composition refers to the weight of the component over the total weight of the composition in which it is present and is expressed as pbw.

11) Density of the foam ($\rho_f$) is referring to the density as measured on foam samples by cutting a parallelepiped of foam, weighing it and measuring its dimensions. The density is the weight to volume ratio as measured according to ISO 845 and is expressed in kg/m³.

12) Polymer density as referred to in this invention is referring to Polyurethane polymer density ($\rho_p$) and is assumed to be 1200 kg/m³ (Randall, D. and Lee S., eds., (2002) The Polyurethanes Handbook, London: Wiley).

13) Polymer Elasticity ($E_p$) as referred to in this invention can be estimated from the equation of Gibson and Ashby (Gibson, L. J. & Ashby, M. F. (1988) Cellular Solids, Pergamon, Oxford) which describes the relationship between foam elasticity, polymer elasticity and relative density. $E_p$ can be represented as follows in equation [1]:

$$E_p = \frac{E_f}{R^2} \tag{1}$$

With
$E_f$ = foam elasticity
Relative density (R) defined as $$R = \frac{\rho_f}{\rho_p}$$

Polyurethane polymer density ($\rho_p$)=1200 kg/m³,
Polyurethane foam density ($\rho_f$) being measured according to ISO 845

Figure 1A:
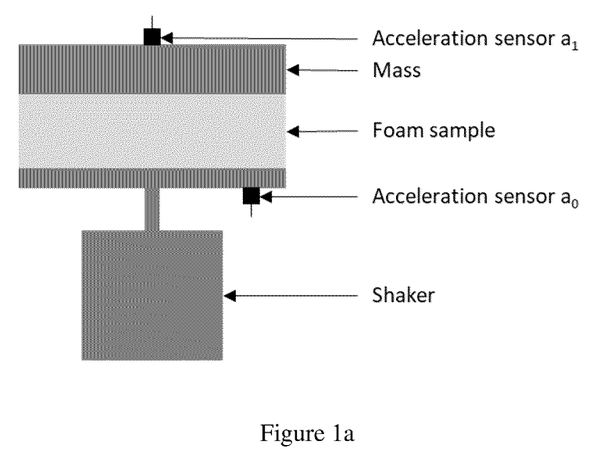
FIG. 1a illustrates the tool set up used to measure the natural frequency c of a foam sample and FIG. 1b illustrates that the natural frequency c of the system is the frequency at which the transmissibility, ratio of the accelerations measured by sensors, is at its maximum.
Figure 1B:
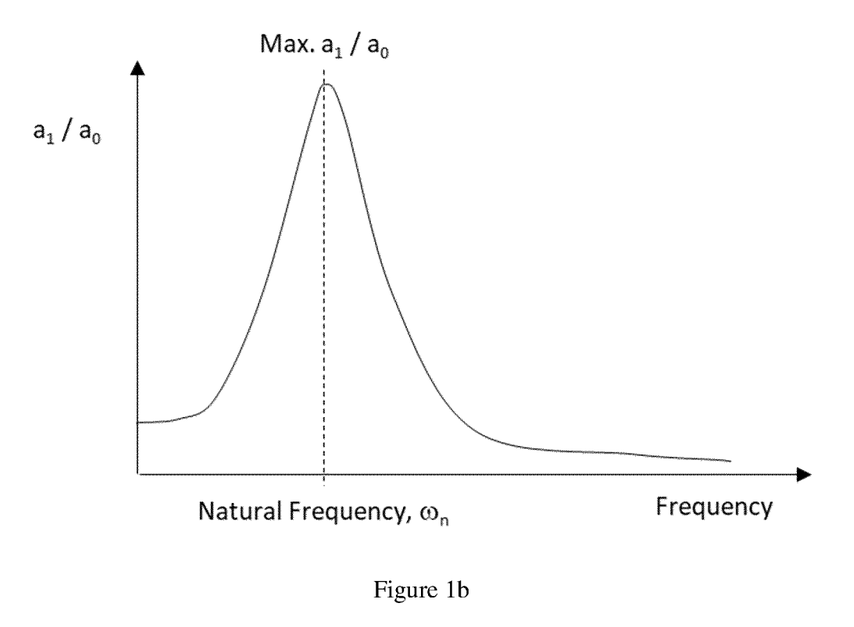
Figure 2A:
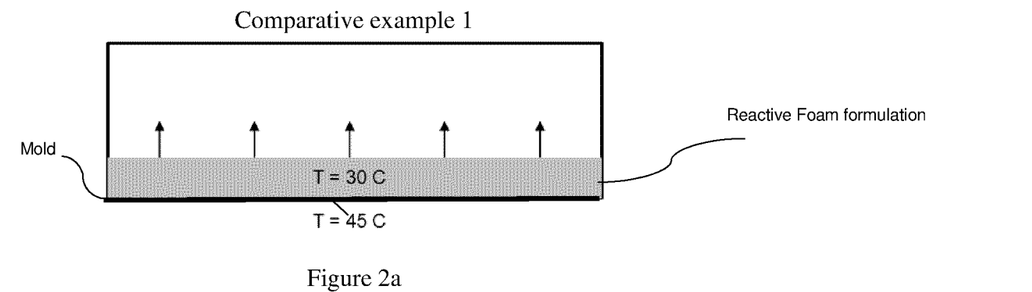
FIG. 2a illustrates the processing conditions used to make comparative example 1 not according to the invention wherein the reactive foam formulation has a temperature of 30° C. and the mold has a temperature of 45° C. such that the temperature difference ($\Delta T$) between the reactive foam formulation ($T_{chemicals}$) and the temperature of the mold ($T_{mold}$) is around 15° C.
Figure 2B:
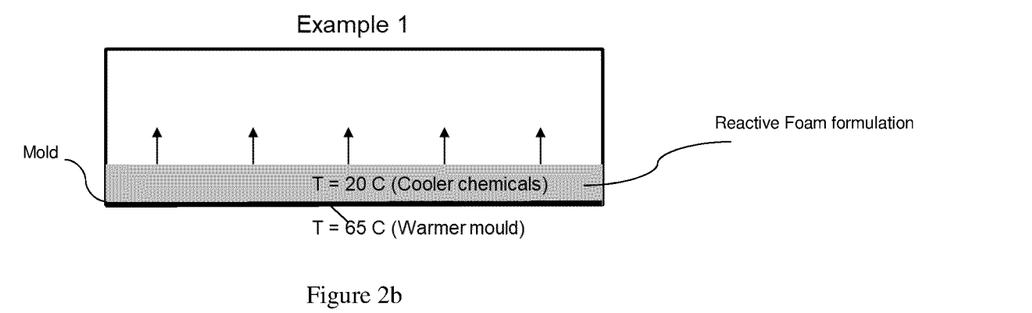
FIG. 2b illustrates the processing conditions according to the invention used to make a flexible foam having a hardness gradient (corresponding to example 1) wherein the reactive foam formulation has a temperature of 20° C. and the mold has a temperature of 65° C. such that the temperature difference ($\Delta T$) between the reactive foam formulation ($T_{chemicals}$) and the temperature of the mold ($T_{mold}$) is around 45° C.

14) Foam Elasticity ($E_f$) as referred to in this invention can be obtained from the natural frequency of a single degree of freedom mass-spring-damper system, called a vibration transmissibility test, consisting of a fixed mass and a foam sample, see FIG. 1a. The natural frequency $\omega_n$ of the system is the frequency at which the transmissibility is at its maximum, see FIG. 1b. $E_f$ can be represented as follows in equation [2]:

$$E_f = \omega_n^2 \frac{mh}{A} \quad [2]$$

With
$\omega_n$=the natural frequency
m=a fixed mass
h=the thickness of the foam sample
A=the cross-section area of the foam sample

DETAILED DESCRIPTION

The present invention is concerned with a flexible polyurethane foam having a hardness gradient going from soft to hard from the top to the bottom of the foam. The hardness gradient in the foam is a result of a foam elasticity gradient which arises from a polymer elasticity gradient and/or density gradient. The hardness gradient translates into a foam having a softer top layer and a harder bottom layer making said foams ideal for making more comfortable foam seats e.g. for use in automotive seats. So, the obtained foam has a softer touch on the surface while the bottom part of the foam makes sure there is sufficient support.

The invention hence discloses a molded flexible polyurethane comprising foam which has a hardness gradient, wherein said foam has at least
- a top layer which corresponds to the layer which is in contact with the lowermost part of the mold and which is when taking the foaming process into account formed in the beginning (at the start) of the foaming process and wherein the top layer has a thickness (height) which can correspond up to 25% of the total thickness (height) of the foam,
- a bottom layer which corresponds to the layer which is in contact with the uppermost part of the mold and which is when taking the foaming process into account formed at the end of the foaming process and wherein the bottom layer of the foam has a thickness (height) which can correspond up to 25% of the total thickness (height) of the foam,
- a foam elasticity $E_f$ in the bottom layer of said foam which is at least 3 times higher, preferably 3 up to 10 times higher than in the top layer of said foam and wherein said foam elasticity corresponds to formula [2]:

$$E_f = \omega_n^2 \frac{mh}{A} \quad [2]$$

With
$\omega_n$=the natural frequency
m=a fixed mass
h=the thickness of the foam sample
A=the cross-section area of the foam sample According to embodiments, the molded flexible polyurethane comprising foam of the invention has a polymer elasticity $E_p$ in the bottom layer of said foam which is at least 2 times higher, preferably 2 up to 8 times higher than in the top layer of said foam and wherein said polymer elasticity corresponds to formula [1]:

$$E_p = \frac{E_f}{R^2} \quad [1]$$

With
Relative density (R) defined as $$R = \frac{\rho_f}{\rho_p}$$

Polyurethane polymer density ($\rho_p$)=1200 kg/m³,
Polyurethane foam density ($\rho_f$) being measured according to ISO 845

According to embodiments, the molded flexible polyurethane comprising foam of the invention has a foam density $\rho_f$ in the bottom layer of said foam which is 10% up to 40% higher than in the top layer of said foam.

According to embodiments, the molded flexible polyurethane comprising foam of the invention has a polymer elasticity $E_p$ in the bottom layer of said foam which is at least 2 times higher, preferably 2 up to 8 times higher than in the top layer of said foam and wherein said polymer elasticity corresponds to formula [1] and a hardness gradient has a foam density $\rho_f$ in the bottom layer of said foam which is 10% up to 40% higher than in the top layer of said foam.

According to embodiments, the molded flexible polyurethane comprising foam of the invention has a polymer elasticity $E_p$ in the top layer which is lower than the polymer elasticity $E_p$ in the core (middle section) of the foam.

According to embodiments, the molded flexible polyurethane comprising foam of the invention has a foam density $\rho_f$ in the bottom half of the foam which is higher than the foam density $\rho_f$ in the top half of the foam.

According to embodiments, the molded flexible polyurethane comprising foam of the invention has a polymer elasticity $E_p$ in the top layer which is lower than the polymer elasticity $E_p$ in the core (middle section) of the foam and a foam density $\rho_f$ in the bottom half of the foam which is higher than the foam density $\rho_f$ in the top half of the foam.

Surprisingly it was found that a combination of a well-defined reactive foam formulation and well-defined process conditions will give rise to the flexible foam according to the invention which is having a hardness gradient, said hardness gradient being a result of a foam elasticity gradient which arises from a polymer elasticity gradient and/or density gradient.

The processing conditions according to the invention used to make the flexible foam having a hardness gradient according to the invention in a mold comprises the use of a well-defined temperature difference (ΔT) between the reactive foam formulation used ($T_{chemicals}$) and the temperature of the mold ($T_{mold}$). To achieve said well-defined temperature difference ΔT either the mold may be heated or either the reactive foam formulation is cooled or alternatively both the mold may be heated, and the reactive foam formulation is cooled.

According to embodiments, the temperature difference ΔT between the initial the reactive foam formulation used ($T_{chemicals}$) and the temperature of the mold ($T_{mold}$) is at least 25-30° C., more preferably at least 30-50° C., most preferred the temperature difference ΔT is at least in the range 35-55° C. Compared to state of the art processing conditions, the invention is dealing with a much bigger temperature difference ΔT between the initial reactive foam formulation used ($T_{chemicals}$) and the temperature of the mold (Timid). State of the art processing usually applies a temperature difference ΔT between the initial the reactive foam formulation used ($T_{chemicals}$) and the temperature of the mold (Timid) of 10-20° C., preferably using AT around 15° C.

According to embodiments, the minimum temperature of the initial the reactive foam formulation used ($T_{chemicals}$) is 10-15° C., preferably $T_{chemicals}$ is around room temperature.

According to embodiments, the temperature of the mold ($T_{mold}$) is at least 50° C. and below 100° C., preferably Timid is in the range 55° C. up to 70° C., more preferably in the range 60° C. up to 70° C. Most preferred Timid is around 65° C.

According to embodiments, the pre-defined temperature of the mold ($T_{mold}$) is achieved by heating at least the lowermost part of the mold, preferably the whole mold is heated.

The reactive foam formulation according to the invention used to make the flexible foam having a hardness gradient according to the invention comprises the use of a well-defined foam formulation comprising at least an isocyanate-reactive composition (a) and a polyisocyanate composition (b).

The polyisocyanate composition (b) according to the invention is comprising diphenylmethane diisocyanate (MDI) and homologues thereof having an isocyanate functionality of 3 or more (Polymeric MDI) and wherein the amount methylene diphenyl 2,4'-diisocyanate (2,4 MDI) is in the range of 0-12% by weight, preferably in the range of 0-10% by weight calculated on the total weight of all polyisocyanate compounds in the polyisocyanate composition, the remaining polyisocyanate compounds being polymeric MDI and methylene diphenyl 4,4'-diisocyanate (4,4 MDI). An example of a commercial available polyisocyanate composition is Suprasec® 4801 from Huntsman.

According to embodiments, the polyisocyanate composition (b) of the invention is first pre-reacted (i.e. pre-polymerized) with a polyol wherein the amount of this reacted polyol in the polyisocyanate composition (b) is in the range 0-40% by weight, preferably in the range 0-30% by weight, more preferably in the range 0-20% by weight, calculated on the total weight of the polyisocyanate composition (b). Isocyanate-reactive composition (a) may be used as the polyol to form the pre-polymerized polyisocyanate composition (b). Alternatively, the polyols used to form the pre-polymerized polyisocyanate composition (b) are similar and/or a selection of the polyols used in isocyanate-reactive composition (a).

According to embodiments, the polyisocyanate composition (b) is a composition comprising diphenylmethane diisocyanate (MDI) and prepolymers having free isocyanate groups made from said MDI, preferably polyisocyanate composition (b) is a composition comprising at least 40%, preferably at least 50% by weight of 4,4'-diphenylmethane diisocyanate (4,4 MDI). Preferably, said polyisocyanate composition (b) is having an NCO value in the range 21 up to 27%, preferably in the range 23 up to 25.5%.

According to embodiments, the polyisocyanate composition (b) is a prepolymer composition wherein the polyisocyanate composition (b) of the invention is pre-reacted (i.e. pre-polymerized) with a polyol. Said prepolymer composition is preferably comprising 0-12% by weight, preferably 0-10% by weight methylene diphenyl 2,4'-diisocyanate (2,4 MDI) and comprising at least 40%, preferably at least 50% by weight of 4,4'-diphenylmethane diisocyanate (4,4 MDI) calculated on the total weight of all polyisocyanate compounds in the polyisocyanate composition and an NCO value in the range 21 up to 27%, preferably in the range 23 up to 25.5%.

According to embodiments, the polyisocyanate composition (b) is a prepolymer composition wherein the polyisocyanate composition (b) of the invention is pre-reacted (i.e. pre-polymerized) with a polyol. Said prepolymer composition is preferably comprising 0-12% by weight, preferably 0-10% by weight methylene diphenyl 2,4'-diisocyanate (2,4 MDI) calculated on the total weight of all polyisocyanate compounds in the polyisocyanate composition and an NCO value in the range 21 up to 27%, preferably in the range 23 up to 25.5%.

According to embodiments, the polyisocyanate composition (b) is a composition comprising 0-12% by weight, preferably 0-10% by weight methylene diphenyl 2,4'-diisocyanate (2,4 MDI) calculated on the total weight of all polyisocyanate compounds in the polyisocyanate composition and an NCO value in the range 21 up to 27%, preferably in the range 23 up to 25.5%.

According to embodiments, the polyisocyanate composition (b) is having an NCO value in the range 21 up to 27%, preferably in the range 23 up to 25.5%.

According to embodiments, the polyisocyanate composition (b) is having an NCO value in the range 20 up to 25.5%, preferably in the range 23 up to 25.5%.

According to embodiments, the isocyanate-reactive composition (a) according to the invention is comprising:
a) a polyether polyol (a1) having an oxypropylene (PO) content of 51-100% by weight, an oxyethylene (EO) content of 0-49% by weight, preferably an oxyethylene (EO) content of at most 20% by weight calculated on the total weight of the polyol (a1), an average nominal hydroxyl functionality of 2-4 and an average molecular weight of 2000-7000, and
b) optionally a polyether polyol (a2) having an oxyethylene content of 50-95% by weight, calculated on the weight of this polyol wherein the weight ratio of polyol (a2) in the isocyanate-reactive composition (a) is in the range of 0 to 20% by weight, preferably in the range 0 to 10% by weight, more preferably in the range 0 to 5% by weight calculated on the total weight of the isocyanate-reactive composition (a), and
c) optionally a filled polyether polyol (a3), also called polymer polyol, wherein the weight ratio of polyol (a3) in the isocyanate-reactive composition (a) is in the range of 0 to 30% by weight, preferably in the range 0 to 20% by weight calculated on the total weight of the isocyanate-reactive composition (a).

According to embodiments, the isocyanate-reactive composition (a) according to the invention is comprising a proportion of primary hydroxyl groups of greater than 70%.

Polyether polyols (a1), (a2) and (a3) used in making the flexible foam according to the present invention are obtained by the polymerisation of propylene oxide and optionally ethylene oxide in the presence, where necessary, of polyfunctional initiators. Said polyether polyols are also referred to as polyoxyethylene-polyoxypropylene polyols. Suitable initiator compounds used to make said polyols contain a plurality of active hydrogen atoms and include water, butanediol, ethylene glycol, propylene glycol, diethylene glycol, triethylene glycol, dipropylene glycol, ethanolamine, diethanolamine, triethanolamine, cyclohexanedimethanol, glycerol, trimethylolpropane, 1,2,6-hexanetriol, pentaerythritol and sorbitol. Mixtures of initiators and/or cyclic oxides may be used. The polyoxyethylene-polyoxypropylene polyols are obtained by the simultaneous or sequential addition of ethylene and propylene oxides to the initiators as fully described in the prior art.

Most preferred examples of Polyether polyols (a1) are polyoxypropylene polyols and polyoxyethylene polyoxypropylene polyols having an average nominal hydroxyl functionality of 2-4 and an average molecular weight of 2000-7000 and an oxyethylene content of at most 20% by weight, calculated on the weight of the polyol. Commercially available examples are Daltocel® F428 and Daltocel® F435 from Huntsman, Alcupol® F4811 from Repsol, Voranol® CP3322, NC 700 and HL 400 from DOW, Caradol® SC 48-08 from Shell and Arcol® 1374 from Bayer.

Most preferred examples of Polyether polyols (a2) are commercially available Daltocel® F442, Daltocel® F444 and Daltocel® F555 from Huntsman.

According to embodiments, the reactive foam formulation according to the invention is further comprising additives such as blowing agents, catalysts, chain extenders and other additives such as fire retardants, fillers, surfactants, . . . . Preferably said additives are added to the isocyanate-reactive composition (a) before combining the isocyanate-reactive composition (a) with the polyisocyanate composition (b).

According to embodiments, the reactive foam formulation according to the invention is comprising blowing agents, said blowing agent preferably comprising water. In preferred embodiments, the blowing agent is selected from water in an amount of 0.5 up to 10% by weight, preferably in an amount of 1 up to 5% by weight calculated on the total weight of all ingredients being present in the isocyanate-reactive composition (a) used to form the reactive foam formulation according to the invention.

According to embodiments, the reactive foam formulation according to the invention is comprising a chain extender. Preferred chain extenders are isocyanate-reactive chain extender having 2-8 reactive hydrogen atoms and a molecular weight of up to 999. Examples are butanediol, ethylene glycol, propylene glycol, diethylene glycol, triethylene glycol, dipropylene glycol, ethanolamine, diethanolamine, triethanolamine, cyclohexane dimethanol, glycerol, trimethylolpropane, 1,2,6-hexanetriol, pentaerythritol, sorbitol and polyoxyethylene diols having an average molecular weight between 200 and 600 and mixtures of such compounds.

According to embodiments, the reactive foam formulation according to the invention is comprising a surfactant, preferably said surfactant is used in an amount of 0.1-5 and preferably 0.2-2% by weight calculated on the total weight of all ingredients being present in the isocyanate-reactive composition (a) used to form the reactive foam formulation according to the invention.

The surfactant is preferably a polysiloxane polymer and more in particular a polyoxyalkylene polysiloxane polymer, preferably having a molecular weight of 5000-60000. Preferred examples of commercially available surfactants are Tegostab® B8734LF and Tegostab® B8738 and Tegostab® B8745 from Evonik.

According to embodiments, the reactive foam formulation according to the invention is comprising catalysts. In preferred embodiments, the catalysts are selected from well-known catalysts that are used in the field of polyurethane foams. Examples of the well-known catalyst include amine-based catalysts and tin catalysts. Generally, catalysts used to make polyurethane flexible foams are roughly classified into gelling catalysts that accelerate the resinification of polyurethane and blowing catalysts that accelerate the foaming of the polyisocyanate component. A preferred gelling catalyst is a tertiary amine catalyst that particularly accelerates the reaction between a polyisocyanate and a polyol and is not particularly limited, and examples thereof include triethylenediamine, 1,8-diazabicyclo[5.4.0]undecene-7, imidazoles such as 1-methyl reactive amine catalyst may be selected from state of the art known tertiary amine catalysts which are able to promote the reaction between a polyisocyanate and a polyol thereby forming a urethane bond meaning that said catalyst can be chemically incorporated in to the polyurethane matrix. Preferably said tertiary amine catalysts have at least one isocyanate-reactive hydrogen atom and preferably one or more primary and/or secondary amine groups and/or one or more hydroxy groups. Examples of suitable reactive tertiary amine catalysts are the following catalysts:

- N,N-3-dimethylaminopropylamine (Jeffcat® DMAPA from Huntsman),
- N,N-dimethylethanolamine (Jeffcat® DMEA from Huntsman),
- N,N-dimethylaminoethoxyethanol (Jeffcat® ZR70 from Huntsman),
- N,N,N'-trimethyl-N'-hydroxyethyl-bisaminoethylether (Jeffcat® ZF10 from Huntsman),
- N,N-bis-(3-dimethylaminopropyl)-N-isopropanolamine (Jeffcat® ZR50 from Huntsman),
- N-(3-dimethylaminopropyl)-N,N-diisopropanolamine (Jeffcat® DPA from Huntsman),
- N,N,N'-trimethyl-N'-(hydroxyethyl)ethylenediamine (Jeffcat® Z110 from Huntsman),
- tetramethyliminobispropylamine (Jeffcat® Z130 from Huntsman),
- N-[2-[2-(dimethylamino)ethoxy]ethyl]-N-methyl-1,3-propanediamine (Dabco® NE 300 from Evonik),
- 2-(dimethylamino-)ethan-1-ol (Jeffcat® TD 20 from Huntsman),
- tetramethyliminobispropylamine (Jeffcat® Z 130 from Huntsman),
- 2-(2-(2-dimethylaminoethoxy-)ethyl methyl amino-)ethanol (Dabco® NE 1061 from Evonik),
- bis(dimethylaminomethyl-)phenol (Dabco® TMR 30 from Evonik).

Furthermore, a foaming process for making the flexible foam having a hardness gradient according to the invention is disclosed, said process comprising reacting at an isocyanate index in the range 70-130, preferably in the range of 75-110, more preferably in the range 75-100, the reactive foam formulation according to the invention in a mold thereby using the processing conditions according to the invention in said mold.

According to embodiments of the invention, the process for making the flexible foam having a hardness gradient according to the invention comprises at least the steps of:

i. pre-mixing the isocyanate-reactive composition (a) according to the invention with chain extenders, catalysts, blowing agents, and other additives, and then ii. mixing the polyisocyanate composition (b) according to the invention with the pre-mixed isocyanate-reactive composition (a) obtained in step i) at an isocyanate index in the range 70-130, preferably in the range of 75-110, more preferably in the range 75-100 is obtained to obtain a reactive foam formulation, and then iii. casting the reactive foam formulation obtained in step ii) into a mold using the processing conditions according to the invention to obtain flexible foam having a hardness gradient, and then iv. demoulding the obtained flexible foam having a hardness gradient.

According to embodiments of the invention, the process for making the flexible foam having a hardness gradient according to the invention comprises at least the steps of:

i. mixing a polyisocyanate composition (b) with the pre-mixed isocyanate-reactive composition (a) obtained in step i. at an isocyanate index in the range 70-130, preferably in the range of 75-110, more preferably in the range 75-100 is obtained to obtain a reactive foam formulation, and then ii. casting the reactive foam formulation obtained in step ii. into a mold to obtain flexible foam having a hardness gradient, and then iii. demoulding the obtained flexible foam having a hardness gradient characterized in that the isocyanate-reactive composition (a) is comprising at least 50% by weight, preferably at least 70% by weight calculated on the total weight of the isocyanate-reactive composition (a) a polyether polyol (a1) having an oxypropylene (PO) content of 51-100% by weight, an oxyethylene (EO) content of 0-49% by weight, an average nominal hydroxyl functionality of 2-4 and an average molecular weight of 2000-7000, the polyisocyanate composition (b) is comprising 0-12% by weight, preferably 0-10% by weight methylene diphenyl 2,4'-diisocyanate (2,4 MDI) calculated on the total weight of all polyisocyanate compounds in the polyisocyanate composition, the remaining polyisocyanate compounds being polymeric MDI and variants thereof, and step iii. is performed such that there is a temperature difference ($\Delta T$) of at least 25-30° C. between the temperature of the reactive foam formulation ($T_{chemicals}$) and the temperature of the mold ($T_{mold}$).

According to embodiments, the isocyanate-reactive composition (a) is first pre-mixed with chain extenders, catalysts, blowing agents, and other additives.

According to embodiments, step iii. is performed such that there is a temperature difference $\Delta T$ between the initial reactive foam formulation ($T_{chemicals}$) and the temperature of the mold ($T_{mold}$) of at least 25-30° C., more preferably at least 30-50° C., most preferred the temperature difference $\Delta T$ is at least in the range 35-55° C.

According to embodiments, the isocyanate-reactive composition (b) in step i. is further comprising a polyether polyol (a2) having an oxyethylene content of 50-95% by weight, calculated on the weight of this polyol wherein the weight ratio of polyol (a2) and the amount of polyether polyol (a2) in the isocyanate-reactive composition (a) is in the range of 0 to 20% by weight, preferably in the range 0 to 10% by weight, more preferably in the range 0 to 5% by weight calculated on the total weight of the isocyanate-reactive composition (a).

According to embodiments, the isocyanate-reactive composition (b) in step i. is further comprising a filled polyether polyol (a3), also called polymer polyol, wherein the weight ratio of polyol (a3) in the isocyanate-reactive composition (a) is in the range of 0 to 30% by weight, preferably in the range 0 to 20% by weight calculated on the total weight of the isocyanate-reactive composition (a).

According to embodiments of the invention, the step of mixing a polyisocyanate composition (b) with the pre-mixed isocyanate-reactive composition (a) is performed using a 2-component high pressure mixing system or a 2-component dynamic mixing system.

According to embodiments of the invention, step iii. (casting the reactive foam formulation obtained in step ii.) into a mold is performed such that the degree of overpack in the mold is kept low, preferably the overpack is such that the calculated overpack ratio of molded density over free rise density) is in the range 1-1.5. This means that the molding (foaming) process is taking place until the mold is just filled.

According to embodiments of the invention, step iii. (casting the reactive foam formulation obtained in step ii.) is performed such that the reactive foam formulation is inserted into the mold at an angle of around 30 degrees (calculated from the bottom plate of the mold) so the foam runs down the slope. This means that the mold surface is horizontal and inlet of the reactive foam formulation is at a slope of 30 degrees thereby promoting that the foam rises vertically.

Furthermore, the invention discloses the use of the molded flexible foam according to the invention in automotive seats, matrasses, furniture, automotive under-carpets and dash insulators, . . . .

EXAMPLES

Chemicals Used:
Suprasec® 2525, a polyisocyanate prepolymer composition comprising about 10 wt % 2,4 MDI calculated on the total weight of all isocyanate compounds in Suprasec® 2525 (the remaining isocyanate compounds being polymeric MDI and 4,4 MDI) and having an NCO value of about 25.5%.
Suprasec® 4801, a polyisocyanate composition comprising about 7 wt % 2,4 MDI calculated on the total weight of all isocyanate compounds in Suprasec® 4801 (the remaining isocyanate compounds being polymeric MDI and 4,4 MDI) and having an NCO value of about 23%.
Suprasec® 7007, a polyisocyanate composition comprising about 15 wt % 2,4 MDI calculated on the total weight of all isocyanate compounds in Suprasec® 7007 (the remaining isocyanate compounds being polymeric MDI and 4,4 MDI) and having an NCO value of about 29.5%.
Daltocel® F428, a polyoxyethylene polyoxypropylene polyol with hydroxyl functionality of 3, a molecular weight of about 6000 and an ethylene oxide content of 15 wt % (at the end of all (all tipped)).
Daltocel® F526, a polyoxyethylene polyoxypropylene polyol with hydroxyl functionality of 3, a molecular weight of about 6000 and an ethylene oxide content of 93 wt %.
Alcupol® P-2321, styrene and acrylonitrile graft reactive polyether polymer with 35% solid content, hydroxyl number of 23 mg KOH/g and molecular weight of 2680 g/mol.
Jeffcat® DPA, polyurethane catalyst
Jeffcat® DMEA, polyurethane catalyst
Jeffcat® LED204 36%, polyurethane catalyst
DELA, crosslinker
Tegostab® B8734LF, surfactant
Tegostab® B8745, surfactant
Tegostab® KE 810L, surfactant
Tegostab® B8738, surfactant
Water.

Example 1 and 2 According to the Invention and Comparative Example 1 and 2

Flexible polyurethane foam examples 1 and 2 according to the invention having a hardness gradient were prepared by mixing a polyisocyanate composition (b) and an isocyanate-reactive composition (a) to form a reactive foam formulation according to the invention. This reactive foam formulation which has a temperature around room temperature was filled into a mold where the temperature difference (ΔT) between the temperature of the reactive foam formulation ($T_{chemicals}$) and the temperature of the mold ($T_{mold}$) is around 45° C.

When example 1 was repeated using the same reactive foam formulation as in example 1 but with a temperature difference (ΔT) between the temperature of the reactive foam formulation ($T_{chemicals}$) and the temperature of the mold ($T_{mold}$) not according to the invention the obtained foam (comparative example 1) did not have a hardness gradient as defined in the invention. The reactive foam formulation in comparative example 1 has a temperature of 30° C. and the mold was at a temperature of 45° C. such that the temperature difference (ΔT) between the temperature of the reactive foam formulation ($T_{chemicals}$) and the temperature of the mold ($T_{mold}$) is around 15° C. which is not sufficient to achieve the flexible foam having a hardness gradient according to the invention.

Comparative example 2 comprises too much 2,4'-MDI content in its polyisocyanate composition used to make the reactive foam formulation and did not yield into a hardness gradient foam according to the invention. In comparative example 2 the polyisocyanate composition comprises 15 wt % 2,4'-MDI calculated on the total weight of all isocyanate compounds in the polyisocyanate composition.

The composition of reactive foam formulations used to make example 1, example 2, comparative example 1 and comparative example 2 are illustrated in Table 1.

TABLE 1

| Chemicals | Example 1 wt % | Example 2 wt % | Comparative Example 1 wt % | Comparative example 2 wt % |
|---|---|---|---|---|
| Polyisocyanate composition (b) | | | | |
| Suprasec ® 2525 | 100 | | 100 | |
| Suprasec ® 4801 | | 100 | | |
| Suprasec ® 7007 | | | | 100 |
| Isocyanate-reactive composition (a) | | | | |
| Daltocel ® F428 | 81.6 | 95.5 | 81.6 | 95.5 |
| Daltocel ® F526 | 3.1 | | 3.1 | |
| Alcupol ® P-2321 | 10 | | 10 | |
| Jeffcat ®DPA | 0.62 | | 0.62 | |
| Jeffcat ® DMEA | 0.2 | | 0.2 | |
| Jeffcat ® LED204 36% | 0.15 | | 0.15 | |
| Jeffcat ® ZF-10 | | 0.1 | | 0.1 |
| DELA | 0.26 | | 0.26 | |
| Tegostab ® B8738 | | 0.2 | | 0.2 |
| Tegostab ® B8745 | | 0.4 | | 0.4 |
| water | 3.1 | 3.1 | 3.1 | 3.1 |
| Isocyanate Index | 80 | 90 | 80 | 90 |

The properties obtained for example 1 and 2 according to the invention and for comparative example 1 and 2 are indicated in Tables 2, 3 and 4.

In Table 2 the foam elasticity ratio (foam elasticity/ average foam elasticity) of different layers of foam is compared. In example 1 and 2 there is a clear increasing foam elasticity going for the top layer to the bottom layer. In comparative example 1 and 2 the top and bottom layers have higher foam elasticity than the core layers.

In Table 3 the foam density ratio (foam density/average foam density) of different layers of foam is compared. In example 1 and 2 the bottom layer has a higher foam density than the other layers. In comparative example 1 and 2 the top and bottom layers of the foam have a higher foam density than the core of the foams.

In Table 4 the polymer elasticity ratio (polymer elasticity/ average polymer elasticity) of different layers of foam is compared. The polymer elasticity of each layer is derived from the foam elasticity according to the formula in the definition of polymer elasticity. In example 1 the top two layers have a much lower polymer elasticity than the other two layers. In example two the polymer elasticity of the top layer is much lower than the other layers. In comparative example 1 and 2 there is limited variation in polymer elasticity of each layer. From these results in example 1 and the variation in the foam elasticity comes mainly from the variation in polymer elasticity in the foam with a second effect being the variation in density, whereas in comparative example 1 and 2 the variation of foam elasticity in the top and bottom layer comes from the density variation.

Figure 3A:
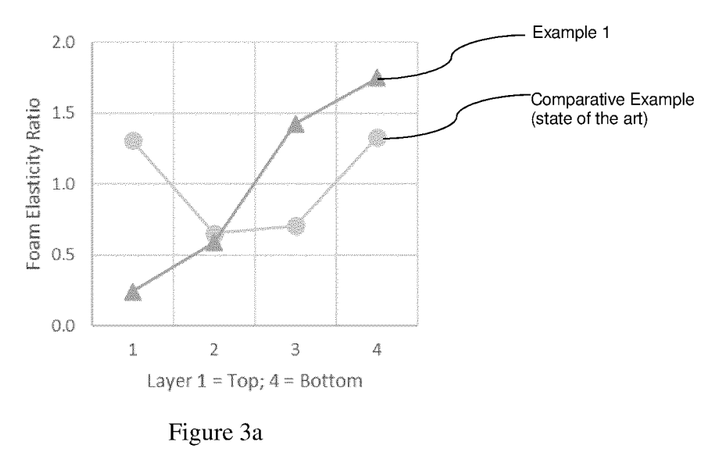
FIG. 3a illustrates the foam elasticity $E_f$ obtained in the different layers in a foam according to the invention (example 1) and a foam not according to the invention (comparative example 1).
Figure 3B:
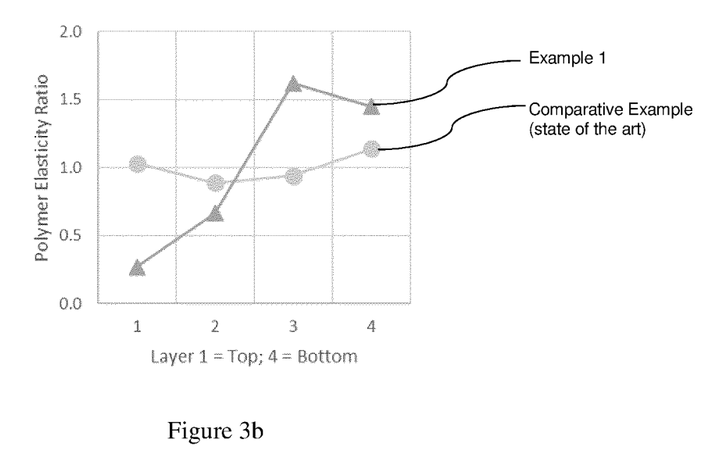
FIG. 3b illustrates the polymer elasticity $E_p$ obtained in the different layers in a foam according to the invention (example 1) and a foam not according to the invention (comparative example 1).

FIGS. 3a and 3b illustrate the foam elasticity and polymer elasticity in the different layers in foams obtained from example 1 and comparative example.

Figure 4A:
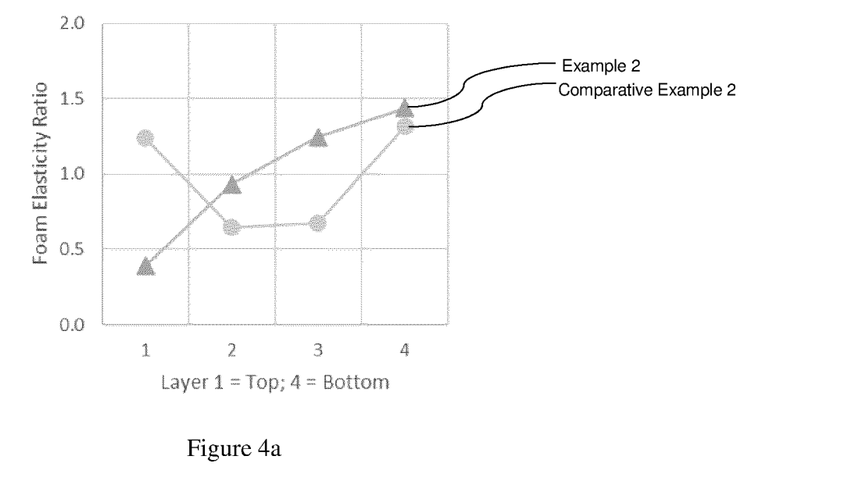
FIG. 4a illustrates the foam elasticity $E_f$ obtained in the different layers in a foam according to the invention (example 2) and a foam not according to the invention (comparative example 2).
Figure 4B:
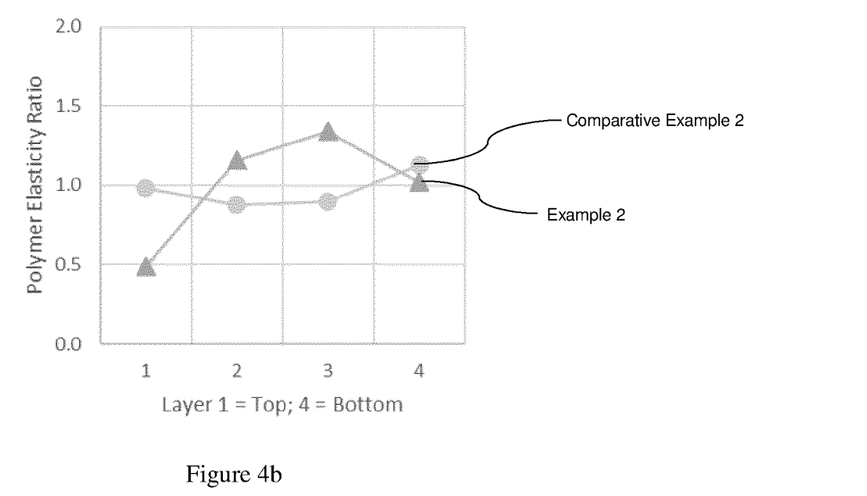
FIG. 4b illustrates the polymer elasticity $E_p$ obtained in the different layers in a foam according to the invention (example 2) and a foam not according to the invention (comparative example 2).

FIG. 4a illustrates the foam elasticity $E_f$ obtained in the different layers in a foam according to the invention (example 2) and a foam not according to the invention (comparative example 2). FIG. 4b illustrates the polymer elasticity $E_p$ obtained in the different layers in a foam according to the invention (example 2) and a foam not according to the invention (comparative example 2).

Figure 5A:
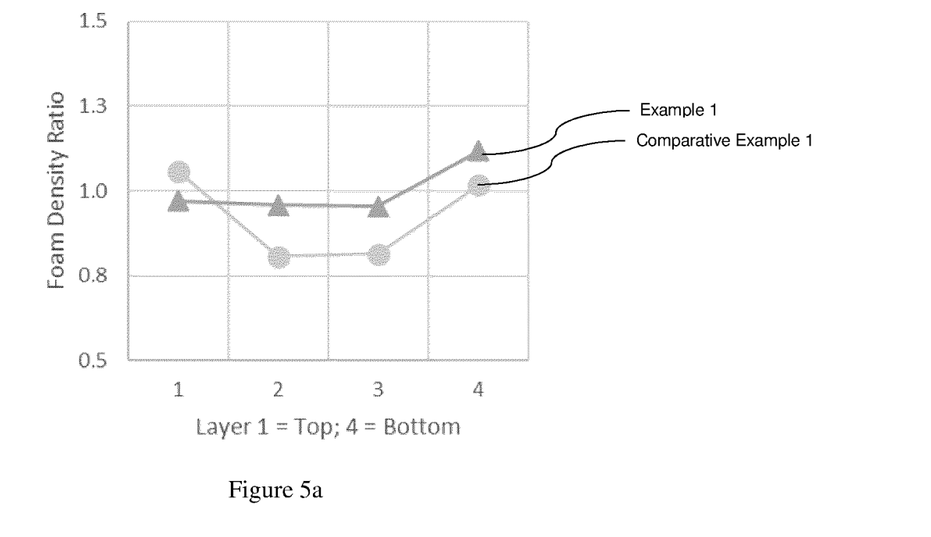
FIG. 5a illustrates the foam density ($\rho_f$) obtained in the different layers in foams according to the invention for example 1 and comparative example 1.

FIG. 5a illustrates the foam density ($\rho_f$) obtained in the different layers in foams according to the invention for example 1 and comparative example 1.

Figure 5B:
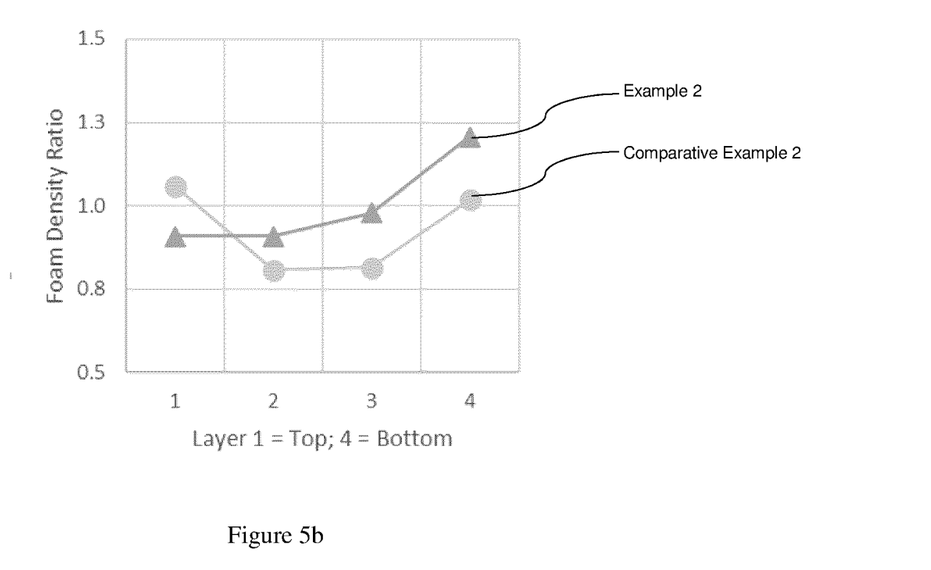
FIG. 5b illustrates the foam density ($\rho_f$) obtained in the different layers in foams according to the invention for example 2 and comparative example 2.

FIG. 5b illustrates the foam density ($\rho_f$) obtained in the different layers in foams according to the invention for example 2 and comparative example 2.

Figure 6:
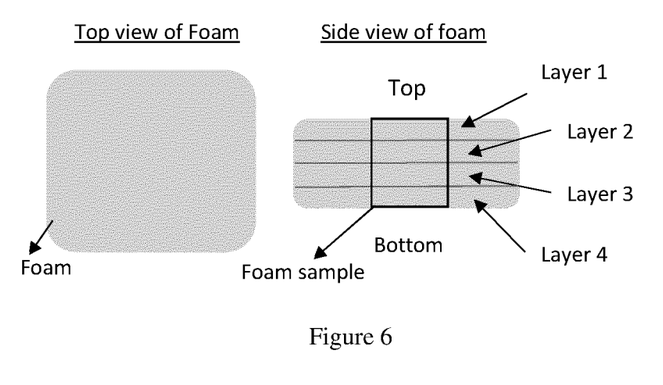
FIG. 6 illustrates a foam sample divided into different layers used to analyze the foam properties and to determine the gradient in density, polymer elasticity and foam elasticity in a foam. The top layer of a foam as defined in the invention corresponds to layer 1 and the bottom layer of a foam as defined in the invention corresponds to layer 4.
Figure 7:
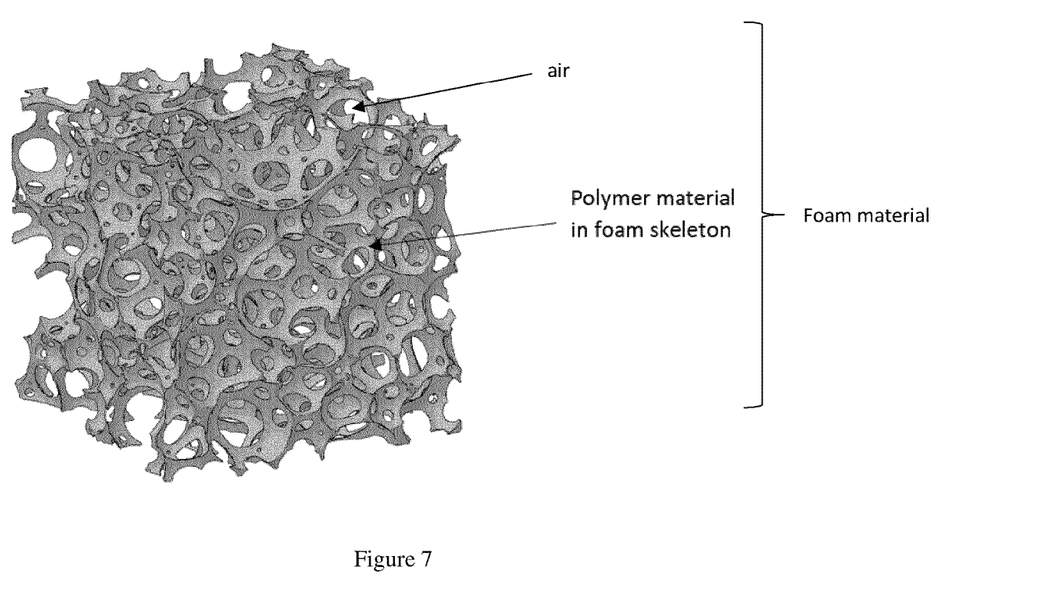
FIG. 7 illustrates a foam material comprising polymer material and air.

To analyze the foam properties the foam sample was divided in different layers as illustrated in FIG. 6.

TABLE 2

| Layer | Example 1 Foam Elasticity Ratio | Comparative Example 1 Foam Elasticity Ratio | Example 2 Foam Elasticity Ratio | Comparative Example 2 Foam Elasticity Ratio |
|---|---|---|---|---|
| 1 (top layer) | 0.2 | 1.3 | 0.4 | 1.2 |
| 2 | 0.6 | 0.7 | 0.9 | 0.6 |
| 3 | 1.4 | 0.7 | 1.2 | 0.7 |
| 4 (bottom layer) | 1.7 | 1.3 | 1.4 | 1.3 |

TABLE 3

| Layer | Example 1 Density Ratio | Comparative Example 1 Density Ratio | Example 2 Density Ratio | Comparative Example 2 Density Ratio |
|---|---|---|---|---|
| 1 (top layer) | 1.0 | 1.1 | 0.9 | 1.1 |
| 2 | 1.0 | 0.8 | 0.9 | 0.8 |
| 3 | 1.0 | 0.8 | 1.0 | 0.8 |
| 4 (bottom layer) | 1.1 | 1.0 | 1.2 | 1.0 |

TABLE 4

| Layer | Example 1 Polymer Elasticity Ratio | Comparative Example 1 Polymer Elasticity Ratio | Example 2 Polymer Elasticity Ratio | Comparative Example 2 Polymer Elasticity Ratio |
|---|---|---|---|---|
| 1 (top layer) | 0.3 | 1.0 | 0.5 | 1.0 |
| 2 | 0.7 | 0.9 | 1.2 | 0.9 |
| 3 | 1.6 | 0.9 | 1.3 | 0.9 |
| 4 (bottom layer) | 1.4 | 1.1 | 1.0 | 1.1 |

The invention claimed is:

1. A molded flexible polyurethane comprising foam with a hardness gradient, wherein said foam comprises at least:
   a top layer which has a thickness which corresponds to around 25% of the total thickness of the foam,
   a bottom layer which has a thickness which corresponds to around 25% of the total thickness of the foam,
   a foam elasticity $E_f$ in the bottom layer of said foam which is at least 3 times higher than in the top layer of said foam, wherein said foam elasticity for each layer is obtained using a single degree of freedom mass-spring-damper system consisting of a fixed mass and a sample of the foam layer, wherein the foam elasticity for each layer is represented by formula [2]:

$$E_f = \omega_n^2 \frac{mh}{A} \quad [2]$$

with
   $\omega_n$=a natural frequency of the foam layer
   m=the fixed mass
   h=a thickness of the foam layer
   A=a cross-section area of the foam layer
   and wherein said foam is made using a reactive foam formulation, said reactive formulation formed by mixing at an isocyanate index in the range 70-130:
   an isocyanate-reactive composition (a) comprising
      a polyether polyol (a1) having an oxypropylene (PO) content of 51-100% by weight, an oxyethylene (EO) content of 0-49% by weight, an average nominal hydroxyl functionality of 2-4 and an average molecular weight of 2000-7000, and
      optionally a polyether polyol (a2) having an oxyethylene content of 50-95% by weight, calculated on the weight of this polyol wherein the weight ratio of polyol (a2) in the isocyanate-reactive composition (a) is in the range of 0 to 20% by weight, calculated on the total weight of the isocyanate-reactive composition (a), and
   a polyisocyanate composition (b) having an NCO value in the range of 21 up to 25.5% and comprising 0-12% by weight methylene diphenyl 2,4'-diisocyanate (2,4'-MDI) calculated on the total weight of all polyisocyanate compounds in the polyisocyanate composition and a balance of polymeric MDI and methylene diphenyl 4,4'-diisocyanate (4,4'-MDI).

2. The molded flexible foam according to claim 1, having a polymer elasticity Ep in the bottom layer of said foam which is at least 2 times higher than in the top layer of said foam and wherein said polymer elasticity for each layer corresponds to formula [1]:

$$E_p = \frac{E_f}{R^2} \quad [1]$$

wherein
R is the relative density of polyurethane polymer to the foam layer, which is defined as
ρ is the polyurethane polymer density, which equals 1200 kg/m³, and
$\rho_f$ is the polyurethane foam density of the foam layer, which is measured according to ISO 845.

3. The molded flexible foam according to claim 1, having a foam density pf in the bottom layer of said foam which is 10% up to 40% higher than in the top layer of said foam.

4. The molded flexible foam according to claim 2, having a hardness gradient has a foam density $\rho_f$ in the bottom layer of said foam which is 10% up to 40% higher than in the top layer of said foam.

5. The molded flexible foam according to claim 2, having a polymer elasticity $E_p$ in the top layer which is lower than the polymer elasticity $E_p$ in the middle section of the foam.

6. The molded flexible foam according to claim 1, having a foam density pf in the bottom half of the foam which is higher than the foam density $\rho_f$ in the top half of the foam.

7. The molded flexible foam according to claim 2, having a polymer elasticity $E_p$ in the top layer which is lower than the polymer elasticity $E_p$ in the middle section of the foam and a foam density $\rho_f$ in the bottom half of the foam which is higher than the foam density $\rho_f$ in the top half of the foam.

8. The molded flexible foam according to claim 1, wherein the polyisocyanate composition (b) comprises at least 40% of the 4,4'-MDI calculated on the total weight of all polyisocyanate compounds in the polyisocyanate composition.

9. The molded flexible foam according to claim 1, wherein the reactive foam formulation further comprises a filled polyether polyol (a3) in an amount up to 30% by weight calculated on the total weight of the isocyanate-reactive composition (a).

10. The molded flexible foam according to claim 1, wherein the reactive foam formulation further comprises blowing agents, catalysts, chain extenders, fire retardants, fillers, and surfactants.

11. The molded flexible foam according to claim 1, wherein the reactive foam formulation further comprises a blowing agent, said blowing agent comprising at least water and the amount of water used is 0.5 up to 10% by weight calculated on the total weight of all ingredients being present in the isocyanate-reactive composition (a) used to form the reactive foam formulation.

12. A process for making the molded flexible foam according to claim 1, said process comprising at least the steps of:
  (i) mixing the polyisocyanate composition (b) with the isocyanate-reactive composition (a) at an isocyanate index in the range 70-130 to obtain the reactive foam formulation, and then
  (ii) casting the reactive foam formulation obtained in step (i) into a mold to obtain flexible foam having a hardness gradient, and then
  (iii) demoulding the obtained flexible foam having a hardness gradient characterized in that step (iii) is performed such that there is a temperature difference (ΔT) of at least 25° C. between the temperature of the reactive foam formulation ($T_{chemicals}$) and the temperature of the mold ($T_{mold}$).

13. The process according to claim 12, wherein the temperature difference ΔT between the initial reactive foam formulation used ($T_{chemicals}$) and the temperature of the mold ($T_{mold}$) is at least 35° C.

14. The process according to claim 12, wherein the minimum temperature of the initial reactive foam formulation used ($T_{chemicals}$) is 10° C.

15. The molded flexible foam according to claim 1, wherein the polyether polyol (a2) is present in the isocyanate-reactive composition (a) at 3.3-20% by weight, calculated on the total weight of the isocyanate-reactive composition (a).

16. The molded flexible foam according to claim 15, wherein the reactive foam formulation further comprises a filled polyether polyol (a3) in an amount of 10.6-30% by weight calculated on the total weight of the isocyanate-reactive composition (a).

* * * * *